(No Model.)
G. A. COLTON.
LATHE CHUCK.
No. 295,229. Patented Mar. 18, 1884.
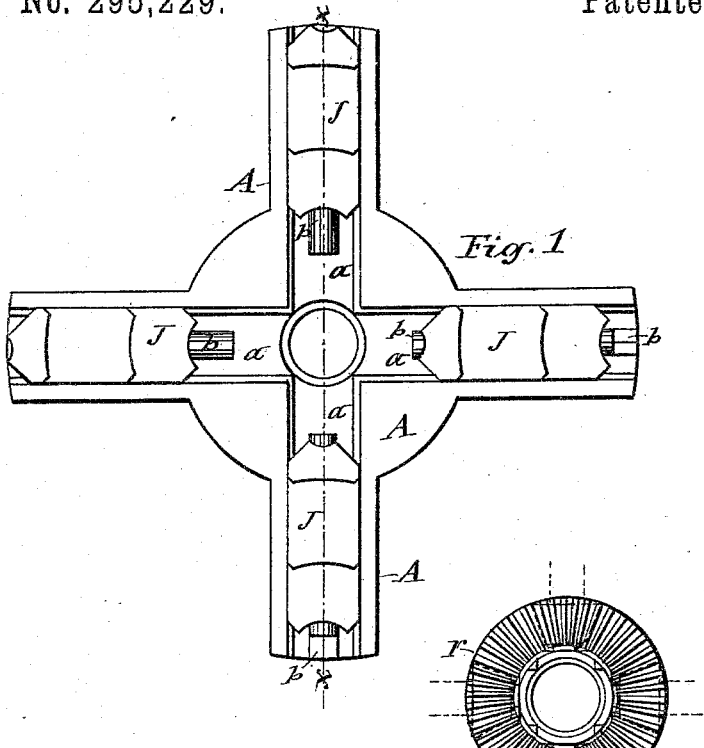
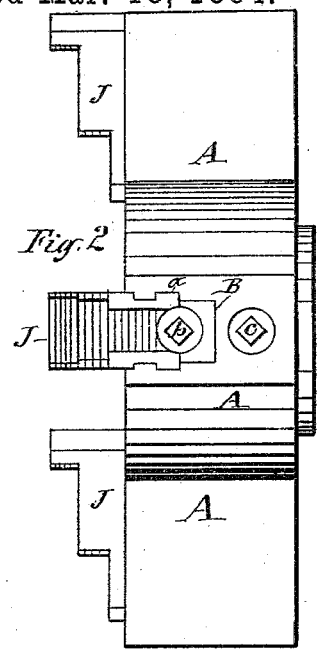
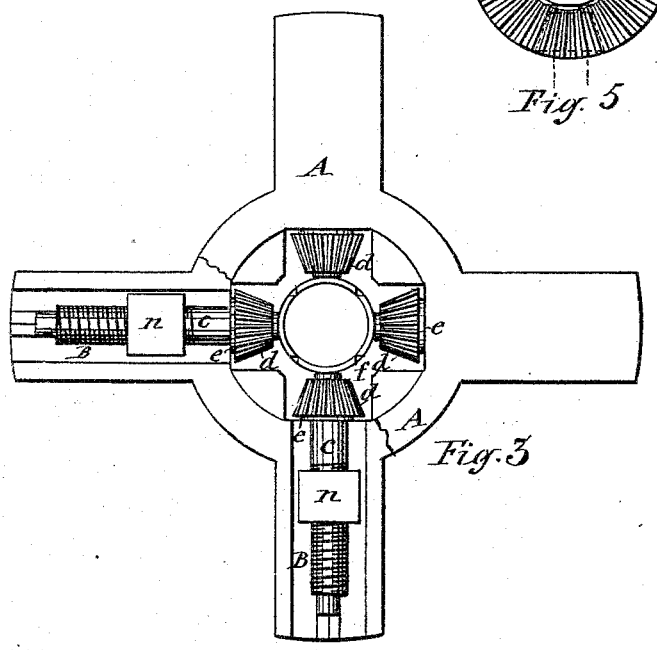
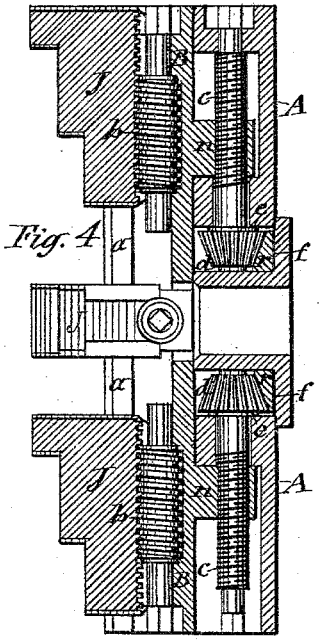
WITNESSES
C. Bendixon
Wm. J. Raymond
INVENTOR:
George A. Colton
per Duell, Laass & Hey
his attys

UNITED STATES PATENT OFFICE.

GEORGE A. COLTON, OF SYRACUSE, NEW YORK, ASSIGNOR OF ONE-HALF TO HENRY C. HOOKER, OF SAME PLACE.

LATHE-CHUCK.

SPECIFICATION forming part of Letters Patent No. 295,229, dated March 18, 1884.

Application filed March 21, 1883. (No model.)

*To all whom it may concern:*

Be it known that I, GEORGE A. COLTON, of Syracuse, in the county of Onondaga, in the State of New York, have invented new and useful Improvements in Lathe-Chucks, of which the following, taken in connection with the accompanying drawings, is a full, clear, and exact description.

This invention relates to the class of chucks designated "geared chucks," in which the dogs or jaws are simultaneously or universally adjusted to the work by means of an annular rack connected with the chuck and engaging with pinions on screws, which are radially disposed in the chuck, and work in nuts which move the jaws toward and from the center of the chuck.

My invention consists in a novel combination, with an annular rack arranged near the center of the chuck, and radial screws having on their inner ends pinions engaging the rack, of certain devices for adjusting the jaws independently of each other; and it also consists in certain peculiarities of the detail construction of the chuck, all as hereinafter more fully described, and set forth in the claims.

The invention is fully illustrated in the annexed drawings, wherein Figure 1 is a front or face view of my improved chuck, with the jaws standing in opposite directions. Fig. 2 is a side view of the same; Fig. 3, a back view with the greater portion of the cover removed; Fig. 4, a transverse section on line $x\ x$ in Fig. 1; and Fig. 5 is an inner face view of the cap or back plate of the chuck.

Similar letters of reference indicate corresponding parts.

A denotes the face-plate or main plate of the chuck, adapted to be secured to the mandrel or spindle of the lathe in the usual manner. Said face-plate is provided with radial channels or ways $a\ a$, which are open at their outer end and in which slide the jaws J J, of the ordinary form, for gripping different kinds of work.

B B designate the so-called "screw-carriers," which slide in the grooves or ways $a\ a$ underneath or back of the jaws, and carry the same by screws $b$, which are interposed between said parts, and seated in a depression in the carrier B, to prevent longitudinal movement of said screws, and have their screw-threads engaging corresponding threads on the adjacent side of the jaws. The aforesaid screws $b$ are extended to the periphery of the chuck or outer end of the ways $a\ a$, so as to be convenient of access for manipulation. By means of these screws the respective jaws can be moved on the carriers B B, and are thus adjustable independently of each other and adapted to be set for holding work eccentric on the lathe-chuck. Each of the carriers B B has integral with it a nut, $n$, in which works a screw, $c$, arranged parallel with the carrier, and having fixed to its inner end a pinion, $d$, the back or outward face of which rests against a shoulder or rigid bearing, $e$, on the side of a depression, $f$, formed in the chuck near the center thereof, for the reception of the pinion $d$, said bearing of the pinion confining the screws longitudinally, and removing the strain as far as practicable from the periphery of the chuck.

In the pinions $d\ d$ of the respective screws $c\ c$ meshes an annular rack or gear, $r$, arranged around the center of the chuck, which rack causes the several screws $c\ c$ to operate synchronously and in unison, and thereby produces the so-called "universal adjustment" of the chuck. The turning of the screws $c\ c$, confined longitudinally, as aforesaid, moves the carriers B B toward and from the center of the chuck, to wit: The outward movement, being unlimited, allows the nuts $n$ to work off from the outer end of the screws $c\ c$ and the carriers B B to be withdrawn endwise from the chuck, together with the jaw riding on said carriers. The jaw may then be readily reversed in its position and reinserted in the chuck, to be taken hold of by the screws $c\ c$. The jaws may also be reversed without removing the carriers from the chuck by running them off from the outer ends of their adjusting-screws.

I am aware that screw-threads on the jaw-carriers have been used in connection with a scroll on the chuck for universally adjusting the jaws; but it is obvious that such devices are more expensive in construction and less reliable and effective in their operation than the combination, with the nuts on the jaw-carriers, of screws working in said nuts in the manner hereinbefore described.

It will be observed that by the arrangement of placing the pinions on the inner end of the screws I greatly facilitate the reversing of the jaws, which, with the ordinary so-called "geared chucks," could not be accomplished without taking the chuck apart, for the reasons hereinbefore stated; also, it entirely obviates the outward strain on the periphery of the chuck, which is produced in other geared chucks, and frequently caused breakage of the same; and it furthermore materially reduces the weight of the chuck and the cost of fitting the parts together, inasmuch as the usual intermediate portions between the jaw-carrying portions of the chuck can be dispensed with, and the chuck be made in the form of a spider having radial arms, provided with the requisite ways for the jaws and their carriers.

Novel features of the body or case of the chuck and of the combination therewith of the jaws, jaw-carriers, their feeding-screws, and the central core or abutment collar are not herein claimed, but are presented in a companion application herewith.

Having described my invention, what I claim as new, and desire to secure by Letters Patent, is—

1. The jaw J and screw $b$, in combination with the carrier B, having integral with it the nut $n$, the screw $c$, pinion $d$, secured to the inner end of the screw $c$, and the gear $r$, arranged around the center of the chuck, all combined substantially in the manner described and shown.

2. In combination with the carrier B, provided with the nut $n$, screw $c$, provided at its inner end with the pinion $d$, and the rack $r$, arranged near the center of the chuck, as shown, the way $a$, extended to the periphery of the chuck, and the shoulder $e$ against the back of the pinion, substantially in the manner described and shown, for the purpose set forth.

In testimony whereof I have hereunto signed my name and affixed my seal, in the presence of two attesting witnesses, at Syracuse, in the county of Onondaga, in the State of New York, this 14th day of March, 1883.

GEORGE A. COLTON. [L. S.]

Witnesses:
FREDERICK H. GIBBS,
WILL C. RAYMOND.